US010303338B2

(12) United States Patent
Hamilton et al.

(10) Patent No.: US 10,303,338 B2
(45) Date of Patent: May 28, 2019

(54) INSCRIPTIONS FOR ELECTRONIC BOOKS (71) Applicant: Amazon Technologies, Inc., Seattle, WA (US)

(72) Inventors: Alistair R. Hamilton, Sammamish, WA (US); Dina Hilal, Kirkland, WA (US); David Stewart Lane, Seattle, WA (US); Jayadev Vadakkanmarveettil, Seattle, WA (US); David Milstein, Redmond, WA (US); Patrick Michael Wolohan, Seattle, WA (US); Danica Knievel, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 567 days.

(21) Appl. No.: 14/870,532

(22) Filed: Sep. 30, 2015

(65) Prior Publication Data
US 2017/0090702 A1 Mar. 30, 2017

(51) Int. Cl.
*G06F 3/00* (2006.01)
*G06F 3/0483* (2013.01)
*G06F 16/955* (2019.01)
*G06F 3/0484* (2013.01)
*G06F 17/30* (2006.01)
(Continued)

(52) U.S. Cl.
CPC .......... *G06F 3/0483* (2013.01); *G06F 3/0484* (2013.01); *G06F 16/9554* (2019.01); *G06F 17/243* (2013.01); *G06F 17/30879* (2013.01); *G06F 21/10* (2013.01); *G06Q 20/123* (2013.01); *G06Q 20/3276* (2013.01); *G06Q 30/0603* (2013.01); *G06Q 30/0617* (2013.01); *G06Q 30/0621* (2013.01); *H04L 67/06* (2013.01); *H04L 67/306* (2013.01)

(58) Field of Classification Search
CPC .......................... G06F 3/0483; G06F 15/0291
See application file for complete search history.

(56) References Cited

U.S. PATENT DOCUMENTS

2002/0082939 A1\* 6/2002 Clark ...................... G06F 21/10
705/26.1
2005/0055627 A1\* 3/2005 Lloyd ..................... G06F 17/21
715/268
(Continued)

OTHER PUBLICATIONS

Inscribber, http://www.inscribbler.com/system.php?page=authorHome, 2013, pp. 1-2.\*

(Continued)

*Primary Examiner* — Tadesse Hailu
*Assistant Examiner* — Andrew Chung
(74) *Attorney, Agent, or Firm* — Lee & Hayes, P.C.

(57) ABSTRACT

This disclosure describes techniques for appending representations of handwritten inscriptions into electronic books, such that electronic books may be customized through the use of inscriptions akin to physical books. To append inscriptions into physical books, a user may provide an inscription on a physical medium. An image of the physical medium including the inscription may be obtained, and the image may be embedded into contents of an electronic book, thus creating a copy of the electronic book that includes a custom inscription in addition to the book contents.

12 Claims, 9 Drawing Sheets

(51) Int. Cl.
*H04L 29/08* (2006.01)
*G06Q 30/06* (2012.01)
*G06F 17/24* (2006.01)
*G06F 21/10* (2013.01)
*G06Q 20/32* (2012.01)
*G06Q 20/12* (2012.01)

(56) References Cited

U.S. PATENT DOCUMENTS

| | | |
|---|---|---|
| 2005/0162699 A1 | 7/2005 | Fukunaga et al. |
| 2006/0271489 A1 | 11/2006 | Flanagan et al. |
| 2009/0009815 A1* | 1/2009 | Karasik .............. G06F 17/30634 358/403 |
| 2010/0078474 A1 | 4/2010 | Rosenblatt et al. |
| 2012/0210269 A1* | 8/2012 | Yonemoto ............. G06F 3/0483 715/776 |
| 2013/0026221 A1 | 1/2013 | Murray et al. |
| 2013/0104028 A1* | 4/2013 | Murray ............... G06F 15/0291 715/234 |
| 2013/0188887 A1* | 7/2013 | Chan ........................ G06K 9/20 382/312 |
| 2013/0275254 A1* | 10/2013 | McKinney ............. G06Q 30/06 705/26.5 |
| 2013/0311870 A1* | 11/2013 | Worsley ............ G06F 17/30952 715/234 |
| 2014/0201624 A1* | 7/2014 | Clark .................... G06F 17/248 715/243 |
| 2014/0258912 A1* | 9/2014 | Patterson .............. G06F 17/242 715/776 |
| 2015/0131870 A1* | 5/2015 | Hudson ................. G06F 3/0483 382/112 |

OTHER PUBLICATIONS

PCT Search Report and Written Opinion dated Nov. 21, 2016 for PCT Application No. PCT/US16/54345, 11 pages.

* cited by examiner

INSCRIPTIONS FOR ELECTRONIC BOOKS

BACKGROUND

A large and growing population of users employs various electronic devices to consume digital content, such as music, movies, images, electronic books, and so on. Authors and distributors of this digital content continue to strive to enhance user experiences and, in some instances, strive to import the traditional benefits of physical content items into the realm of digital content items. These efforts introduce new technological challenges. Embodiments discussed herein provide technological solutions to these new challenges.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure describes, in part, techniques for appending representations of handwritten inscriptions into electronic books, allowing for customization of electronic books akin to customization of physical books.

To append inscriptions into electronic books, a user may inscribe an inscription onto a physical medium. The inscription may comprise a note, drawing, doodle, or the like, and may be inscribed using a pen, pencil, stamp, paintbrush or any other sort of drawing, writing, or painting tool. For instance, the inscription may be a simple note (e.g., "Happy 8$^{th}$ birthday, Griffin! I hope you enjoy this book!"), a drawing (e.g., of a birthday cake and balloons), or the like. The physical medium, meanwhile, may comprise a physical card (as discussed in further detail below) or any other type of physical medium, including a piece of paper, a napkin, a wall, a physical copy of a book, a printable signature page, or any other surface.

After creating the inscription, the user or another user may use an electronic device to capture an image that includes the inscription, for later inclusion of the inscription into a copy of an electronic book. In some instances, the electronic device may provide the image of the inscription to a content-management service, which provides electronic books to user devices. The content-management service may append the image of the inscription to a copy of an electronic book and may provide the copy of the electronic book—that now includes the image of the inscription—back to the electronic device or to another electronic device. For instance, the content-management service may append the representation of the inscription proximate to a beginning location of the copy of the electronic book. In instances where the electronic book comprises visual text, the inscription may appear in front of a majority of this visual text. In instances where the electronic book comprises an audio book, the inscription may be presented during some or all of playback of the audio book, such as during a beginning portion of the playback, during all of the playback, or the like.

In some instances, the content-management service may insert content in addition to, and based on, the inscription. For instance, the content-management service may implement text-recognition techniques to identify keywords in the inscriptions and my insert artwork based on these keywords. To do so, the service may store a mapping of words and phrases to corresponding artwork. For instance, if the content-management service recognizes the phrase "happy birthday", the service may insert a picture of a birthday cake or balloons in addition to (or in the alternative from) the original inscription.

In other instances, after the electronic device of the user captures the image of the inscription, the electronic device itself may locally insert the inscription into an electronic book. For instance, the electronic device of the user may insert the representation of the inscription proximate to a beginning location of the copy of the electronic book.

In some instances, a first user may inscribe an inscription onto a physical card that is associated with a particular electronic book. For instance, the physical card may illustrates details associated with a particular electronic book, such as cover art, author name, illustrator name, publisher name, book length, and the like. For instance, a physical card for a particular electronic book may include cover art that is the same as or similar to cover art for a physical version of the same title. The physical card may also list the author of the title, the illustrator of the title, and the like.

In addition, the physical card may include information identifying the particular title, such as a barcode printed on the physical card, a quick response (QR) code printed on the physical card, or an alphanumeric string printed on the physical card. In some instances, the information identifying the title may be covered beneath a material that a user may "scratch off" to reveal the information, such as the claim code.

In some instances, the information identifying the electronic-book title may be used to redeem the physical card for a copy of the corresponding electronic book. For instance, a user device may capture the identifying information and provide this information to a content-management service, which may in turn send contents of the electronic book to the user device and/or otherwise associate the electronic book with a user account of the user at the content-management service. For instance, a user of the user device may manually enter in the information identifying the electronic book, scan the information using an image sensor (e.g., a barcode scanner), capture an image of the information using an image sensor (e.g. a camera), or may otherwise input the information identifying the book in any other manner. After doing so, the user device may upload this information to the content-management service, which may identify the electronic book using the information.

In addition to illustrating details of the title and information identifying the title, the physical card may include an area where a user may provide an inscription. For instance, the physical card may include an area (e.g., circular, polygonal, etc.) for providing an inscription, as well as instructions informing the user that the area is for providing an inscription that will be appended to the copy of the electronic book. In some instances, a first user may acquire the card and may provide an inscription in the area before gifting the card to a second user (e.g., "Happy birthday, Grace! Enjoy this book!"). In another instances, a first user may acquire the physical card and may ask a second user (e.g., an author of the title) to provide an inscription in the area (e.g., "Thank you for buying my book, Brooklyn!").

In either instance, after an inscription has been inscribed on the physical medium, such as the card, the inscription may be associated with a copy of the electronic book, thus customizing that copy. For instance, a user device may capture an image of the inscription area and may provide this information to the content-management service. The user device may also provide the information identifying the electronic book, along with an identifier associated with a user account of the user at the content-management service. This user-account identifier may comprise a phone number, device identifier (DID) of the user device, a username of the user account, or the like.

Upon receiving this information from the user device, the content-management service may use the identifier associated with the user account (e.g., the DID of the device sending the information) to identify the user account of the user at the content-management service. The content-management service may also use the information identifying the electronic book to identify the electronic-book title. In addition, the content-management service may store the image of the inscription in association with the user account.

In addition to the above, the content-management service may in some instances create a file that includes: (i) the contents of the electronic book, and (ii) the image of the inscription. For instance, the created file may include the contents of the electronic book, with the inscription embedded near a front of the contents, near an end of the contents, in multiple locations, or elsewhere within the contents of the electronic book. In some instances, the content-management service may associate this created file with the user account such that the user that operates the user device may later obtain the created file using the user device and/or another device associated with the user and the user account. In addition, the content-management service may send this created file to the user device that initially provided the information, to one or more other user devices associated with the user account, and/or the like. For instance, in response to receiving this information, the content-management service 104 may automatically download the book to one or more devices associated with the user account of the recipient.

In other instances, in response to receiving this information, the content-management service may send data for rendering a graphical user interface (GUI) to the user device that sent the information. The user device may receive the data and present this GUI, which may include details regarding the electronic book (e.g., author name, user reviews, related titles, etc.) along with a control for requesting to acquire the electronic book (which may have been paid for at the time of acquiring the physical card). This GUI may additionally or alternatively include details regarding other electronic books or items (e.g., movies, physical items, etc.). In some instances, the GUI may also include one or more controls for requesting to acquire a physical (e.g., paperback, hardback, etc.) copy of the title, another title (in digital or physical form), other items, and/or the like.

In still other instances, the GUI may indicate that funds have been added to the user account associated with the user device (and with the user) in response to the user device providing the information to the content-management service. That is, when the user scans a barcode on the physical card and sends this information to the content-management service, the content-management service may send back a GUI indicating that the user is now able to obtain an electronic book using these newly-acquired funds or indicating that value has been added to the user account, which may be used for acquiring one or more items at the content-management service or potentially at other locations.

In one specific example, a first user purchases a physical card associated with a particular electronic-book title from a merchant. The first user, intending to gift the electronic book to a second user via the physical card, then provides an inscription to be read by the second user, the recipient. The first user then provides the physical card to the second user. After receiving the physical card, the second user may, for example, scan a barcode on the physical card and capture an image of the inscription, potentially while the device of the second user is operating within a client application provided by the content-management service. The user device of the second user then sends this information to the content-management service, which uses this information along with an identifier of the device of the second user to identify the appropriate user account and electronic-book title. The content-management service then appends the image of the inscription (or data based on this image) to a copy of the electronic book and stores this created file in association with the user account. Further, while the above example describes the second user scanning a barcode and subsequently capturing an image of the inscription, in some instances the device may receive this information based on a single user action. For instance, the second user may use the client device to capture an image that includes both the inscription and the barcode, and both items may later be identified via analysis of the captured image.

Thereafter, the second user may use the client application provided by the content-management service to request the copy of the electronic book from the same device or from another device, such as electronic book reader of the second user. In response to receiving this request, the content-management service may again identify the user account associated with the requesting device, obtain the created file stored in association with the user account, and send this created file to the device of the second user. When the device receives and presents the created file, the electronic book may include (e.g., at the front of the book) the image of the inscription, followed by the contents of the book. As such, the recipient is now able to experience the benefits of reading a digital version of the book title, while still experiencing the personalization of the inscription provided by the gifting user.

In addition to the above, in some instances the inscription may be inscribed on a physical medium other than the described physical card. For instance, the inscription may appear on a piece of paper, a napkin, a wall, a physical copy of a book, a printed signature page, or any other surface. In the example of the printable signature page, this page may be designed to indicate a location for the inscription (e.g., via a box, a circle, or other indicator(s) informing the inscriber of where to place the inscription). In some instances, when a user later captures an images of the signature page, the application on the device (or a server that receives the images) may use the indicators to identify the portion of the image corresponding to the inscription. The device or the server may then crop the image using the indicator(s) and may append the image including the inscription to one or more electronic books.

Further, in some instances one inscription may appear across multiple books. For instance, a user may be able to select which electronic books to which an inscription should be appended. In one example, a user may receive an inscription from a particular author and may choose to associate the inscription with each electronic book written by the author owned by the user. In another example where the inscription is associated with a book that is part of a particular collection, the inscription may be associated with each book in the collection owned by the user. A "collection" of books may include a series, all books by a particular author, all books related to a particular topic, a group of books identified by the customer or a third party (e.g., a book list), or any other type of group.

In still other instances, the inscriptions from the physical cards described herein may be shared by recipients of the physical cards across one or more social networks, in addition or in the alternative to sharing the fact that the recipients received an inscription for an electronic book. For instance, upon receiving a file containing contents of an electronic book and a representation of an inscription, the content-management service may also provide a control that is selectable by a recipient to share the inscription with contacts of the recipient on a particular social network. In some instance, the file (created by the content-management service) that includes the contents of the electronic book and the inscription may include this link. In other instances, the content-management service may additionally or alternatively provide a control that is selectable by the recipient to share the fact that the recipient received an inscription for the electronic book (e.g., a link entitled "share that you received an electronic book with a customer inscription!").

In still other instances, the identifier of the physical card may be used by multiple users to obtain multiple copies of the electronic book. For instance, the identifier of a physical card (e.g., the redemption code printed thereon) may be used a single time to obtain a pre-paid copy of the book. Thereafter, however, others may provide the same identifier (e.g., redemption code) to the content-management service, causing the service to direct the devices of these users to a landing page associated with the book, such as an item detail page from which the book may purchased. In some instances, a discount may be offered to these subsequent users based on these users navigating to the content-management service via one of the physical cards. In some of these instances, if a subsequent user purchases the book after providing the identifier of a particular card (e.g., the redemption code) to the content-management service, then the content-management service may provide a portion of the value of this purchase to the original purchaser of the card and/or to the recipient of the card that obtained the pre-paid copy of the book.

In addition to the above, in some instances a user may request to obtain a physical version of the book with the inscription printed therein. For instance, if a recipient receives a physical card that includes an inscription inscribed thereon, the user may provide a claim code of the card to the content-management service along with an image of the inscription. In response, the content-management service may return data for presenting a GUI on the user device, with the GUI including controls to request to acquire a digital representation of the book, a physical version of the book, and/or other items. The user may request, via the GUI, to obtain the physical version of the book. The content-management service may print the inscription onto a front page of a copy of the book (or at another location) before shipping the now-customized copy of the physical version of the book to an address associated with an account of the user at the content-management service.

The techniques of implementing inscriptions within electronic books may be implemented in a variety of ways and by a variety of servers and electronic devices. While a few examples are illustrated and described below, it is to be appreciated that other servers and electronic devices may implement any similar or different techniques. Furthermore, it is noted that the term "electronic book", "eBook", "digital representation of a book" or "content item" as used herein, may include any type of content which can be stored and distributed in digital form (e.g., magazines, photographs, artwork, etc.). By way of illustration, and without limitation, electronic books and content items can include all forms of textual information such as books, magazines, newspapers, newsletters, periodicals, journals, reference materials, telephone books, anthologies, proceedings of meeting, forms, directories, maps, manuals, guides, references, photographs, articles, reports, documents, etc., and all forms of audio and audiovisual works such as music, multimedia presentations, audio books, movies, etc.

Figure 1:
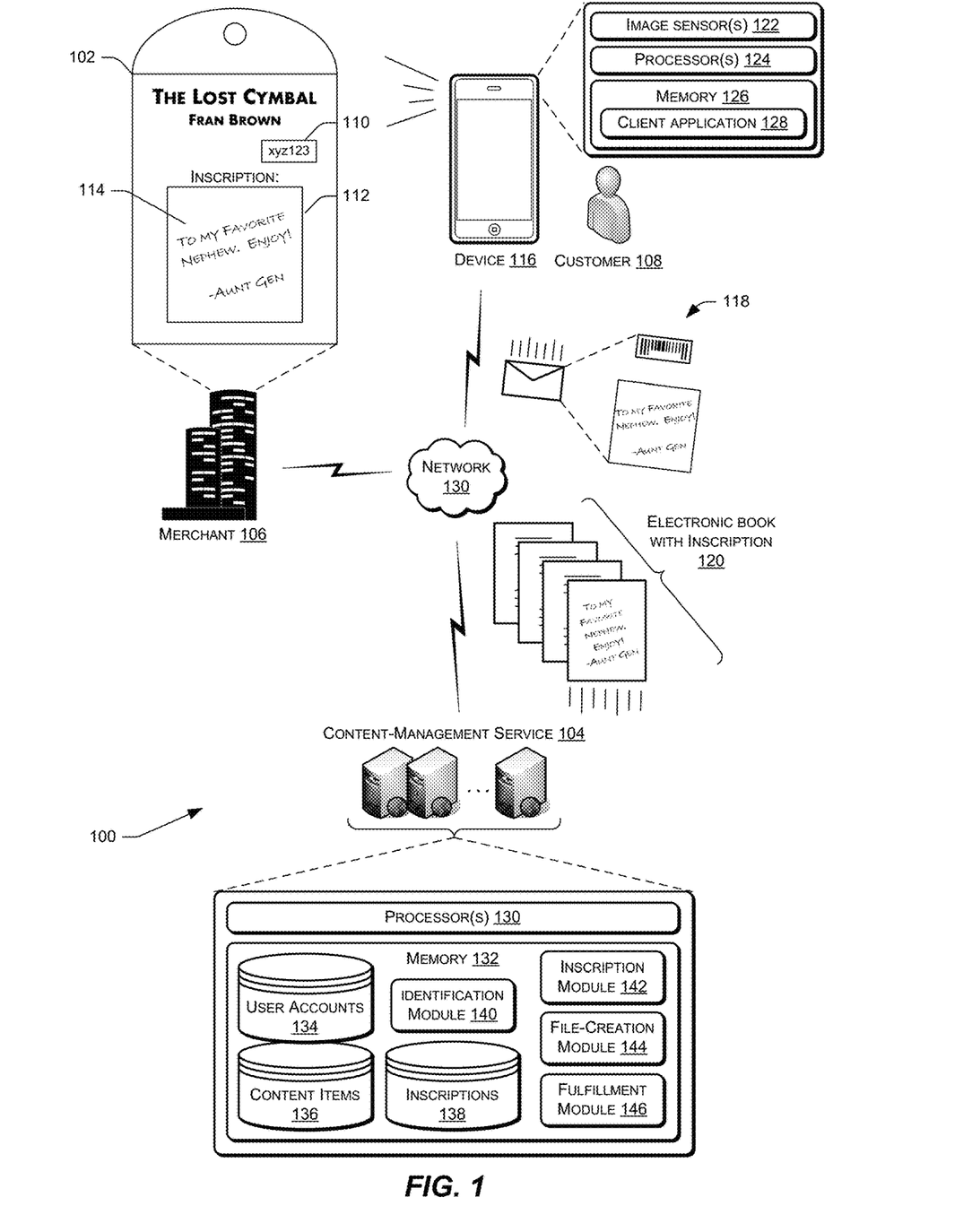
FIG. 1 illustrates an example environment where a merchant offers a physical card for acquisition, with the physical card corresponding to an electronic book. The physical card includes information, such as a barcode, claim code, or the like, that when provided to a content-management service results in the service providing the corresponding electronic book to a user device. In some instances, the physical card also includes an area where a user may inscribe an inscription, such that an image of the inscription may be captured and appended to a copy of the electronic book prior to the copy being provided to the user device.

FIG. 1 illustrates an example environment 100 in which physical cards, such as a physical card 102, may be implemented for assisting in appending inscriptions to electronic books. The environment 100 also includes a content-management service 104, which may create and distribute the physical cards to one or more merchants, such as a merchant 106. The merchants may then offer the cards for acquisition (e.g., purchase, rent, lease, borrow, etc.). For instance, the merchant 106 may provide the physical card 102 to a customer 108 (or to another customer who gifts otherwise provides the card 102 to the customer 108). It is noted that while FIG. 1 illustrates the merchant being separate from the content-management service 104, in some instances the content-management service 104 may itself offer the physical cards to customers, such as the customer 108.

In the illustrated example, the physical card 102 may include details regarding the book title associated with the physical card. In this instance, the physical card 102 indicates that it is associated with (and, in some instances therefore, redeemable for) the electronic book entitled "The Lost Cymbal" by Fran Brown. In addition to these details, the physical card 102 includes an identifier 110 that associates the physical card with the electronic-book title at the content-management service 104. In some instances, the identifier 110 is associated with the general electronic-book title ("The Lost Cymbal"), and thus each physical card associated with this title includes the same identifier 110. In other instances, the identifier 110 is unique, even relative to other physical cards associated with the same electronic book. In either instance, the identifier 110 may be used to identify the electronic book associated with the physical card 102.

In addition, the physical card 102 may include an area 112 in which a user may provide an inscription, such as a note, drawing, doodle, stamp, or any other type of information that is printable by hand and/or by a mechanical or electrical tool (e.g., a pencil, a stamp, a typewriter, etc.). In this example, the physical card 102 has in fact been inscribed with an inscription 114 comprising a handwritten note stating: "To my favorite nephew. Enjoy!—Aunt Gen". As such, in this example, a first customer (Aunt Gen) may have acquired the physical card 102 from the merchant 106 and provided (e.g., gifted, sold, rented, etc.) the physical card 102 to her nephew, the customer 108.

In response to receiving the physical card 102, the customer 108 may utilize his electronic device 116 to capture information regarding the physical card 102 and provide this information to the content-management service 104. For instance, the device 116 may receive an input specifying the identifier 110 (e.g., from a user typing in the example alphanumeric code "xyz123") and may capture or receive an image of the inscription 114, and may provide this information as one or more messages 118 to the content-management service 104. The device 116 may also provide an identifier of the device 116, credentials, or other information to allow the content-management service 104 to identify a user account of the customer 108 at the content-management service 104.

In response to receiving this information, the content-management service 104 may identify the user account of the customer 108 as well as the electronic-book title associated with the physical card 102. The content-management service 104 may also store the image of the inscription in association with the user account. In addition, the content-management service 104 may create a file that includes contents of the electronic book along with the image or the inscription embedded therein. At this point, or after later receiving an explicit request for the electronic book from the device 116 of the customer 108, the content-management service 104 may send a copy 120 of the electronic book with the inscription to the device 116, which may present the electronic book along with the image of the inscription to the customer 108.

As illustrated, the device 116 may include one or more image sensors 122, one or more processors 124, and memory 126. The image sensors 122 may include a camera, a barcode scanner, and/or the like to capture the image of the inscription, to capture information from the identifier 110 (e.g., in instances where the identifier comprises a barcode or the like), or the like. Further, while FIG. 1 illustrates that the identifier 110 may comprise an alphanumeric string that the customer 108 may manually enter into his device, in other instances the identifier 110 may comprise a barcode, a quick-response (QR) code, or the like.

The memory 126, meanwhile, may have access to a client application 128 for interacting with the content-management service 104 and/or for presenting electronic books. For instance, the client application 128 may be configured to send the information associated with the identifier 110 and/or the image of the inscription 114 to the content-management service 104. In addition, the client application 128 may present the electronic book including the inscription upon receiving the copy 120 from the content-management service 104.

The content-management service 104, meanwhile, may comprise one or more servers that include one or more processors 130 and memory 132. The memory 132 may have access to a datastore 134 storing information regarding one or more user accounts, a datastore 136 of content items available to customers such as the customer 108, and a datastore 138 of one or more images of inscriptions. In addition, the memory 132 may have access to an identification module 140, an inscription module 142, a file-creation module 144, and a fulfillment module 144.

Upon receiving the one or more messages 118 from the device 116, the identification module 140 may attempt to identify a user account associated with the messages using the information provided by the electronic device 116. For instance, the device 116 may send a DID of the device 116, a username of the customer 108, or the like, which the identification module 140 may use to identify the user account of the customer 108. In addition, the identification module 140 may identify the electronic book that is associated with the physical card 102, using the information associated with the identifier 110.

In addition, the inscription module 142 may function to store the image of the inscription 114 in association with the identified user account of the customer 108. In some instances, the inscription may be embedded into a copy of an electronic book, while in other instances the image of the inscription may additionally or alternatively be stored in association with the user account as a separate content item. In the latter instances, the content-management service 104 may store multiple inscriptions associated with a particular user account as a collection, such that the corresponding user may view each of these inscriptions sequentially when viewing the collection. Additionally, the user may alter a sequence of the inscriptions in the collection.

The file-creation module 144, meanwhile, may create a file comprising contents of the electronic book and the image of the inscription embedded therein, such as proximate to a front of the electronic book. The file-creation module 144 may also store a copy of the created file in association with the identified user account. Finally, the fulfillment module 146 may send a copy of the created file including the contents of the electronic book and the image of the inscription to the device 116 and/or to another device associated with the user account of the customer 108. In some instances, the fulfillment module 146 sends this file directly in response to receiving the one or more messages 118, while in other instances the fulfillment module 146 sends this file in response to receiving a later request from a client device associated with the identified user account.

Figure 2:
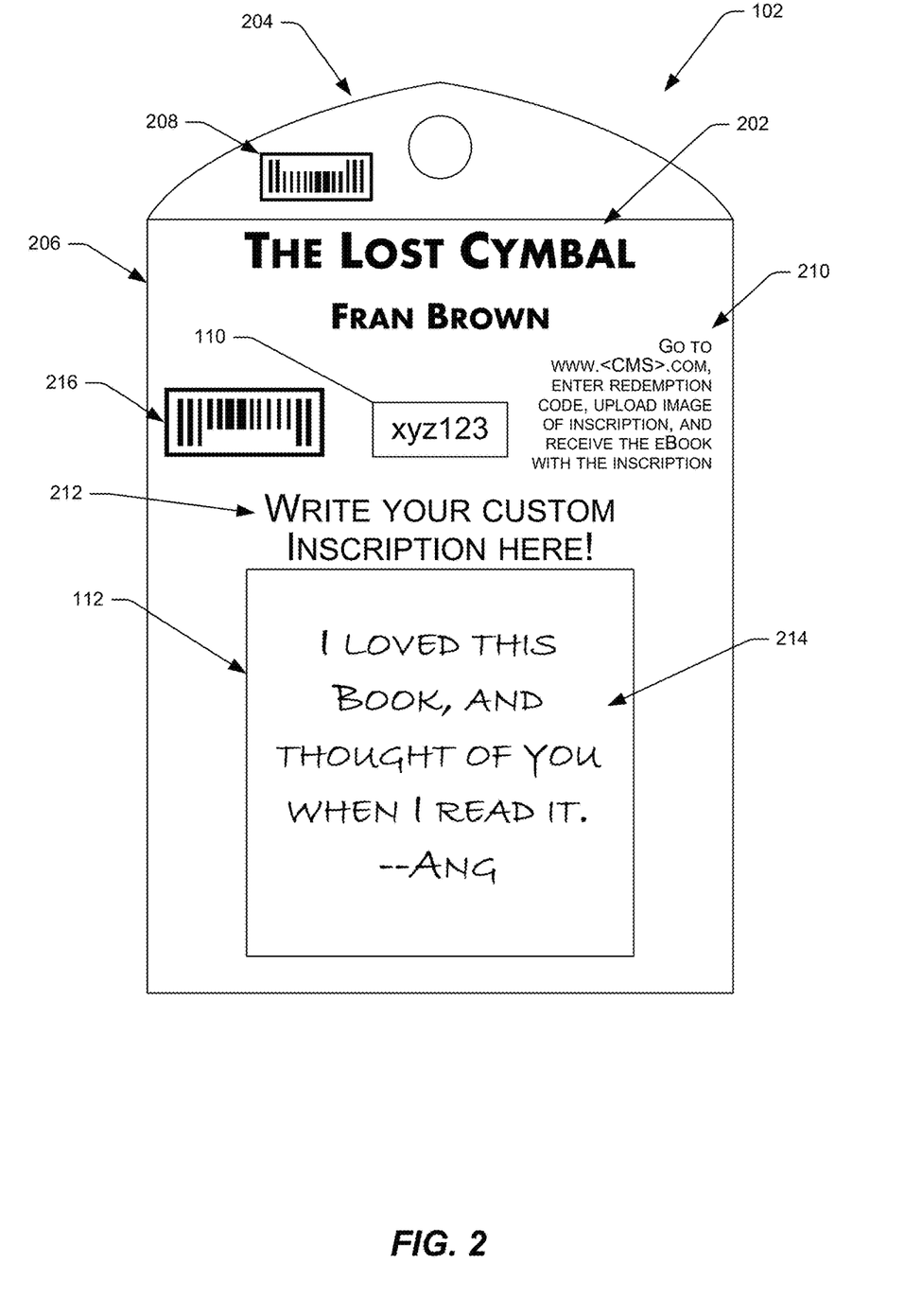
FIG. 2 illustrates an example physical card that may be associated with an electronic book and may include an area allowing a user to inscribe an inscription for inclusion in a copy of the electronic book. For instance, a first user may acquire (e.g., purchase, rent, etc.) the physical card, provide an inscription on the physical card, and then provide the physical card to a second user. The second user may then redeem the physical card for a copy of the electronic book, with the copy including a representation of the inscription.

FIG. 2 illustrates details of the example physical card 102 that includes the area 112 for providing an inscription for later inclusion in a copy of an electronic book. As illustrated, the physical card 102 may comprise details 202 regarding the electronic book that is associated with the physical card 102. Again, in this example the physical card 102 is associated with the fictional title "The Lost Cymbal" by Fran Brown. In addition, the physical card 102 may comprise a first portion 204 and a second portion 206. The first portion 204 may include an activation code 208 for use by a merchant that offers the physical cards, such as the merchant 106, to activate the card 102 with the content-management service 104. For instance, the activation code 208 may comprise a barcode or other type of identifier that the merchant scans, for instance, for sending an activation request to the content-management service 104. Upon receiving information indicative of the activation code 208, the content-management service 104 may store an indication that a customer may now redeem the value of the card 102 at the service 104 (e.g., to obtain the identified book). In some instances, the physical card 102 includes a serration between the first portion 204 and the second portion 206, such that the merchant 106 may separate the first portion 204 from the second portion 206 and may provide the second portion 206 to the purchasing customer, while retaining or discarding the first portion 204 (e.g., after activating the card 102).

The second portion 206, meanwhile, includes the details 202 regarding the electronic-book title and the inscription area 112, along with the identifier 110 of the physical card discussed above with reference to FIG. 1. Again, a customer may enter the identifier into his or her device, which in turn may provide this information to the content-management service, which may in turn provide the book to the device and/or associate a value of the card 102 to an account of the customer. In this regard, the second portion 206 also includes instructions 210 explaining to a recipient of the card how to obtain the copy of the electronic book represented by the physical card, as well as how to ensure that the inscription is appended to the electronic book. In these example instructions 210, the recipient is told to navigate to a (fictional) website associated with the content-management service 104, enter the "redemption code" (i.e., the identifier 110) on a graphical user interface (GUI) provided by the website, upload an image of the inscription via the GUI, and receive a copy of the book (e.g., on that device, on another device, in a user account of the recipient, etc.). While these example instructions 210 instruct the recipient of the card to navigate to a website to enter the redemption code, in other instances the recipient may utilize a client application executing on a device of the recipient to provide this information, potentially along with the image of the inscription. In addition, in some instances the redemption code 110 may be covered with a material that is "scratched-off" by the recipient of the card prior to the code 110 becoming revealed and visible. Further, while FIG. 2 illustrates the identifier 110 as an alphanumeric string, in other instances this identifier may comprise a barcode, a QR code, or the like.

In addition, the second portion 206 includes instructions 212 for the user providing the inscription, such as example inscription 214. As illustrated, these example instructions instruct a user of the card to write their custom inscription in the area 112 provided.

The second portion may also include a second identifier 216 for use by a merchant, such as the merchant 106, to charge a customer for purchasing the physical card 102 from the merchant. For instance, when a customer requests to purchase the physical card 102 from the merchant 106, the merchant may utilize a point-of-sale (POS) device to scan the second identifier 216 to "ring up" the customer. While FIG. 2 illustrates an example physical card 102, it is to be appreciated that the details are merely illustrative and other implementations may include more or fewer details.

FIGS. 3A-3D collectively illustrate a process 300 for implementing inscriptions within electronic books. It is to be appreciated that the process 300 is merely illustrative, and that other embodiments may implement more, fewer, and/or different steps than those illustrated. The example process 300 is explained with reference to the merchant 106, a purchaser 302 of a physical card, the content-management service 104, and a recipient 304 of the physical card obtained by the purchaser 302.

Figure 3A:
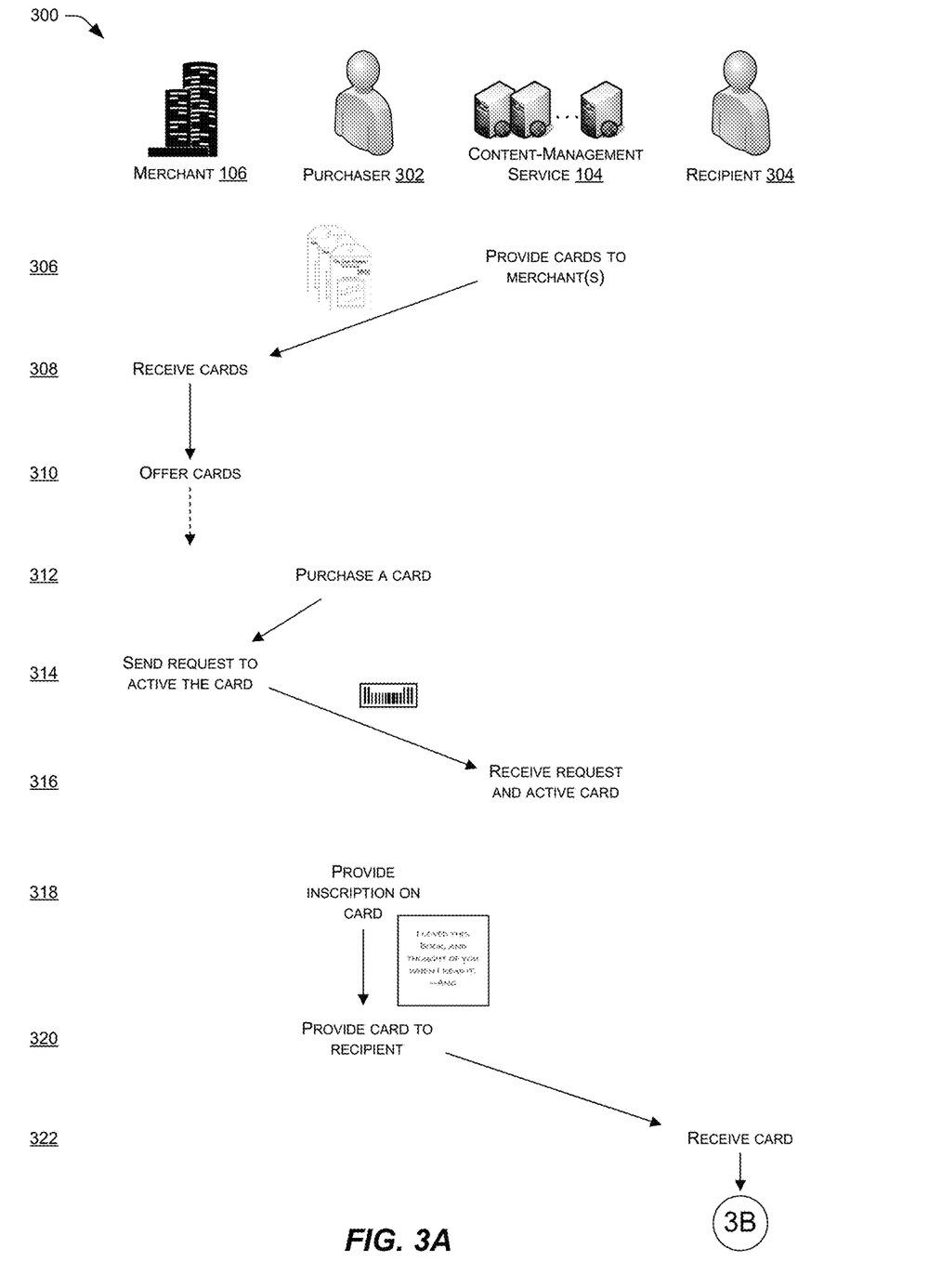
FIGS. 3A-3D collectively illustrate a process by which a merchant may offer one or more physical cards to users, a purchaser may obtain a physical card and provide an inscription on the physical card, a recipient may receive the physical card and provide an image of the inscription to a content-management service, and the content-management service may send a copy of an electronic book—including the inscription—to a device of the recipient.

At 306, the content-management service 104 provides physical cards to one or more merchants, such as the merchant 106. As described above, each of the physical cards may be associated with a particular book title. At 308, the example merchant 106 receives one or more of the physical cards and, at 310, offers the physical cards to one or more customers, such as the purchaser 302.

At 312, the purchaser 302 purchases an example physical card (e.g., the physical card 102) from the merchant 106, who in turn sends a request to activate the card to the content-management service 104 at 314. The content-management service 104 may be performed by the merchant 106 or a third party. At 316, the content-management service 104 receives the request and activates the card such that a subsequent user may successfully request to obtain a copy of the electronic book associated with the now-activated physical card. It is noted that while FIG. 3A illustrates and describes the content-management service 104 as performing the activating, in some instances a third-party may activate the card.

At 318, the purchaser 302 provides an inscription on the card. For instance, the purchaser 302 may write a custom note, drawing, or the like on the card. At 320, the purchaser 302 provides the card to the recipient 304, who receives the card at 322.

Figure 3B:
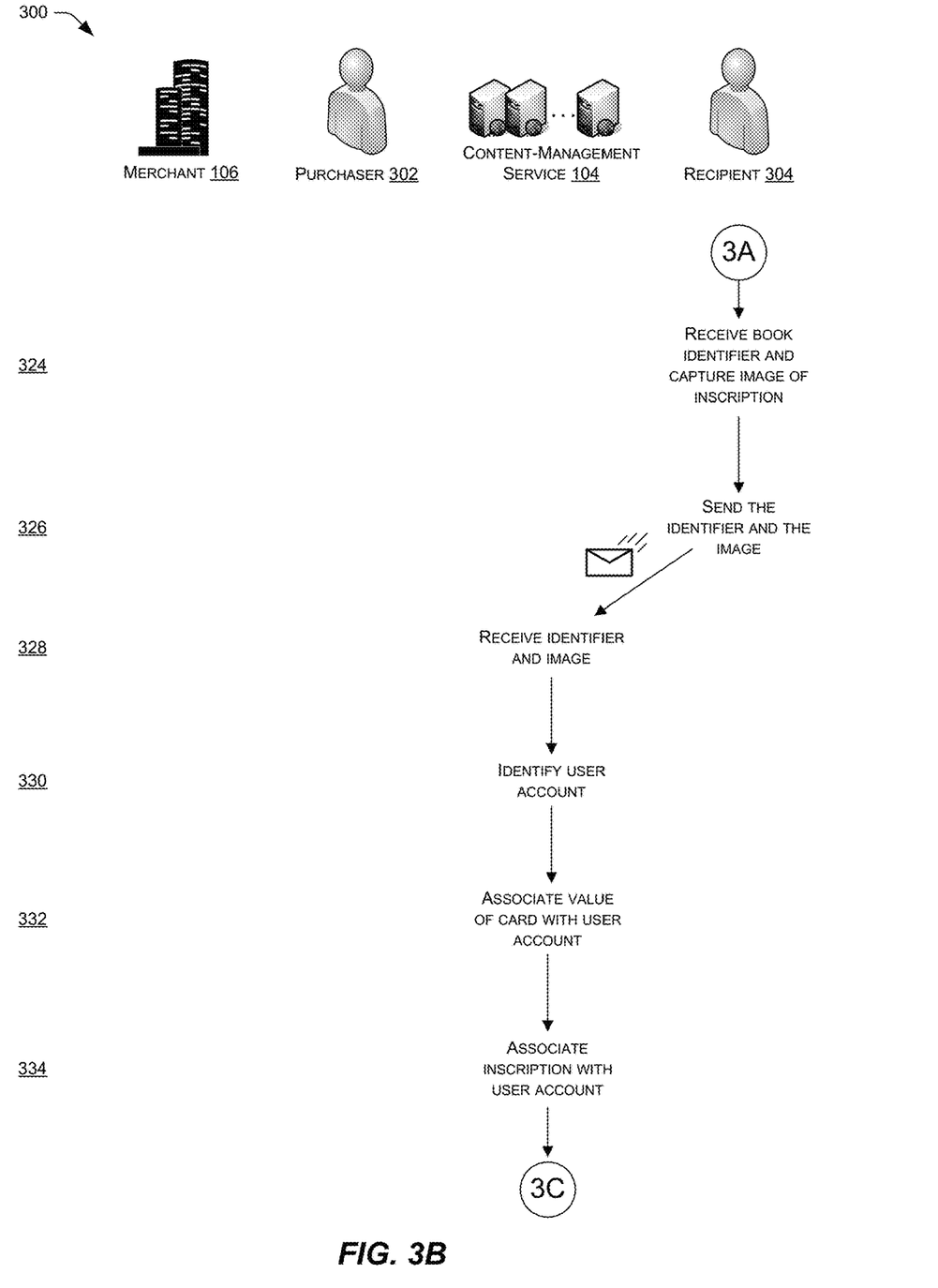

FIG. 3B continues the illustration of the process 300 and includes, at 324, the recipient 304 inputting information from the identifier of the physical card (e.g., the redemption code) and capturing an image of the inscription. At 326, the device of the recipient 304 may then send: (i) information acquired from the identifier, and (ii) the image of the inscription to the content-management service 104. In some instances, the device may package the identifying information and the image together, while in other instances the device may send multiple messages. In addition, the device of the recipient 304 may send information usable to identify a user account of the recipient at the content-management service 104. As discussed above, this information may comprise a DID of the recipient device, a username of the recipient 304 at the content-management service 104, or the like. In still other instances, in response to the device of the recipient 304 sending the information discussed above, the content-management service 104 may request that the recipient log-in with the content-management service 104 such that the service 104 is able to accurately identify the recipient 304.

In either instance, the content-management service 104 receives the identifying information and the image at 328 and identifies, at 330, the user account of the recipient at the content-management service 104. At 332, the content-management service 104 may associate the value of the card with the user account of the recipient 304. In some instances, this may include storing an indication that the recipient 304 now has access to the particular electronic book that is associated with the physical card. In other instances, meanwhile, this may include adding a monetary value to the user account of the recipient, who may use that value to obtain the electronic book, a physical copy of the book, and/or another item from the content-management service 104. In some instances, the physical card is marked with a value (e.g., $9.99) and the account is associated with the marked value, while in other instances the monetary value associated with the user account may be based on the cost of the associated book when the card when purchased or activated, when the recipient 304 requests to obtain the book, or the like. In addition to the above, at 334 the content-management service 104 associates the image of the inscription with the user account of the recipient.

Figure 3C:
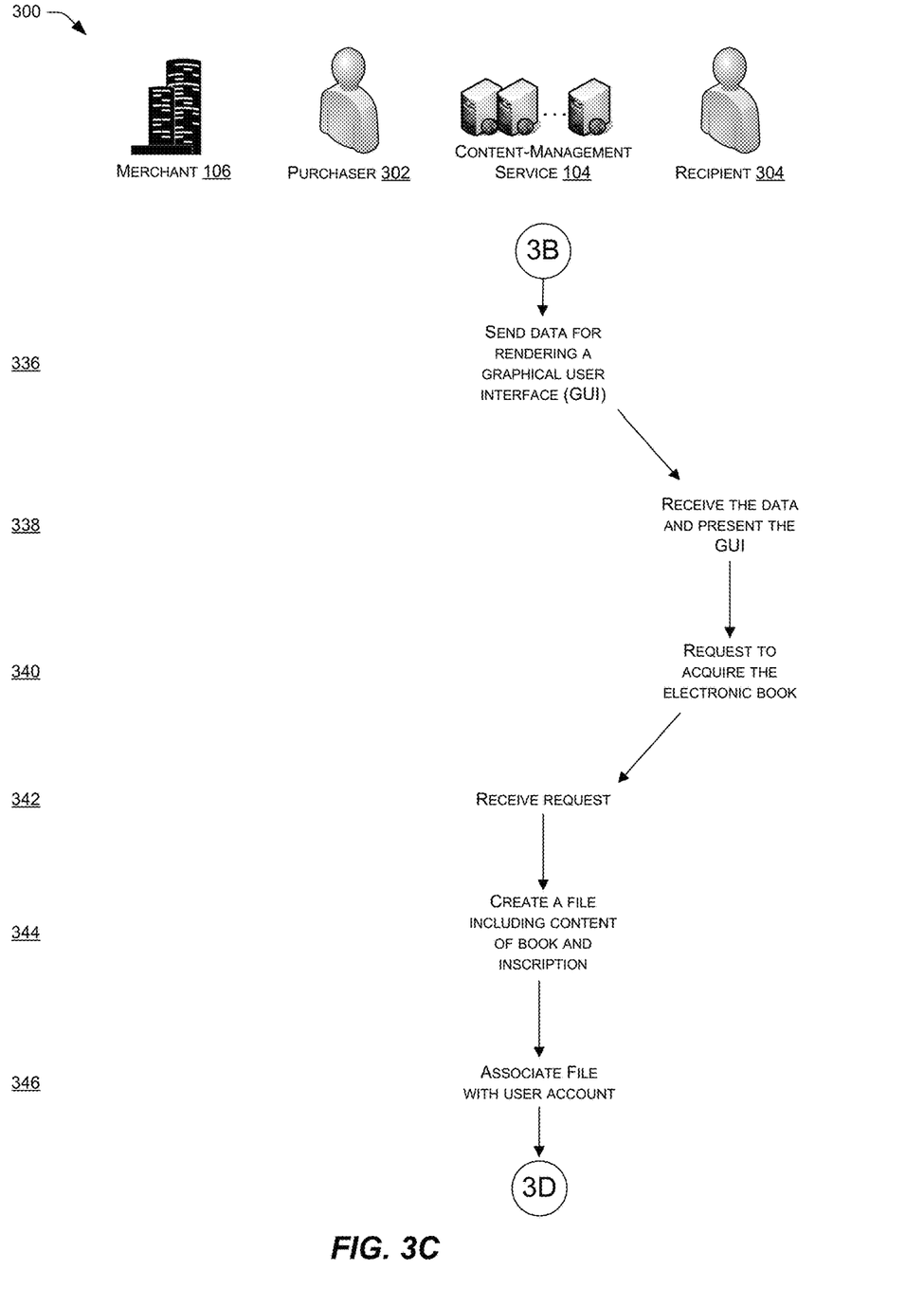

FIG. 3C continues the illustration and, at 336, illustrates the content-management service 104 sending data to the device of the recipient 304 for presenting a GUI on the device. As described above, this GUI may comprise information regarding the electronic book, a control for requesting to acquire the electronic book, a control for requesting to acquire a physical version of the same title, a control for requesting to acquire a different title (digital or physical), a control for requesting to acquire a non-book item, information indicating that value has been added to the account of the recipient at the content-management service 104, and/or the like. At 338, the device of the recipient receives the data and presents the GUI.

At 340, in this example the recipient 304 uses the GUI to request to acquire the electronic book associated with the physical card he received from the purchaser 302. At 342, the content-management service 104 receives this request and, at 344, creates a file that includes contents of the electronic book and the image of the inscription. While this example describes creating the file after receiving this request, in other instances the content-management service 104 may create this file earlier in the process. At 346, the content-management service 104 associates the created file with the user account of the recipient 304, such that the recipient 304 may receive this file from the content-management service 104 when requested.

Figure 3D:
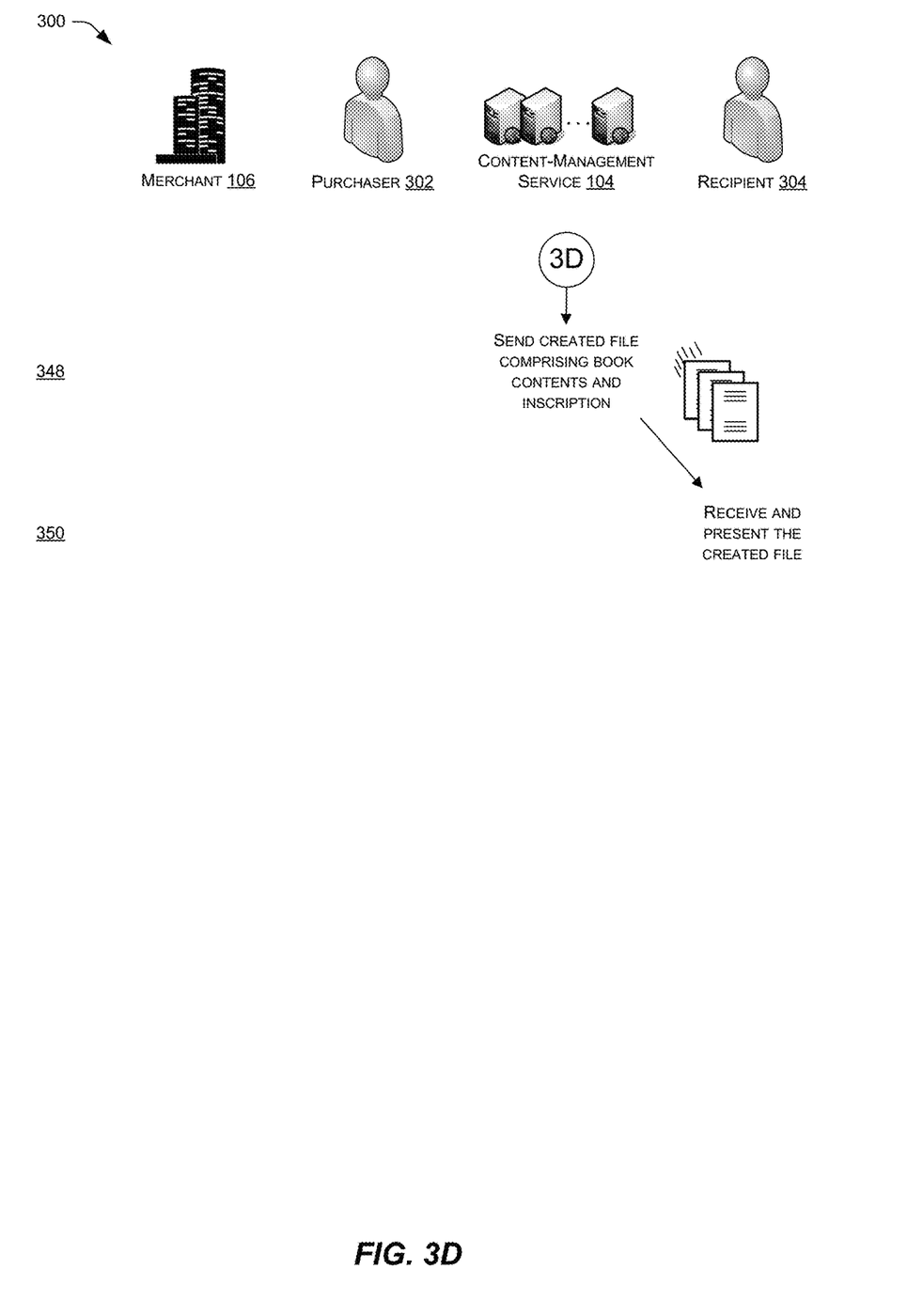

FIG. 3D concludes the illustration of the process 300 and includes, at 348, the content-management service 104 sending the created file to the device of the recipient 304. At 350, the device of the recipient 304 receives and presents the created file, potentially beginning with the custom inscription originally provided by the purchaser 302. Of course, while FIG. 3C illustrates including the inscription into the book sent to the device of the recipient 304, in some instances the recipient 304 may select whether or not to include the inscription with the contents of the electronic book. Further, while the process 300 illustrates the recipient 304 providing the image of the inscription at 326, in other instances the image of the inscription may be provided at any other location in the process 300, such as after the content-management service has identified the book and associated the value with the account of the recipient. For instance, after the recipient 304 redeems the value of the card and later requests to obtain a copy of the book, the content-management service may request an image of the inscription (if an inscription exists and the recipient 304 wishes to append it to the book). Further, while this process 300 describes associating the inscription with the particular electronic book represented by the physical card, in some instances the recipient may instruct the content-management service 104 to append the inscription to one or more other books owned by the recipient.

Figure 4:
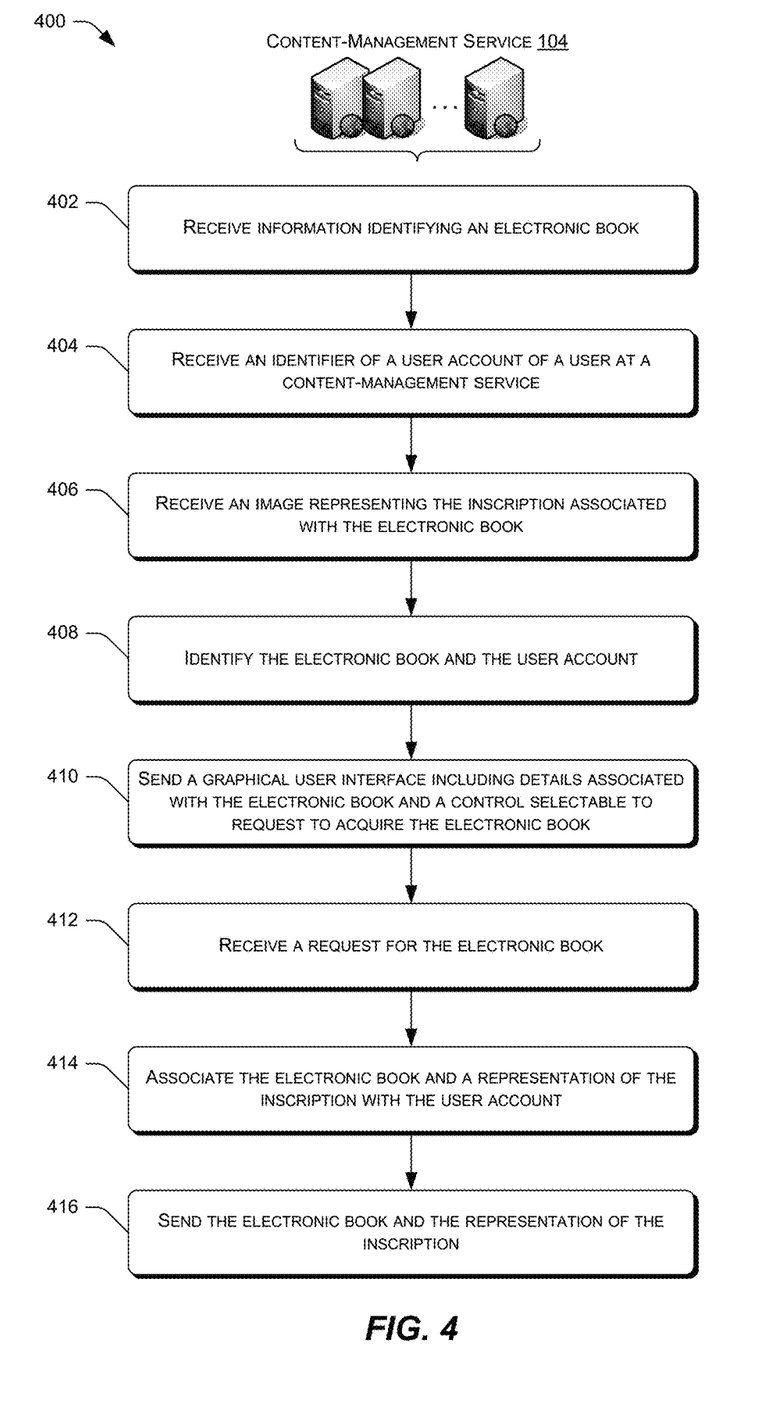
FIG. 4 illustrates a flow diagram of a process in which a content-management service receives an image including a representation of an inscription associated with an electronic book and provides, to a user device, a copy of the electronic book and the representation of the inscription.
Figure 5:
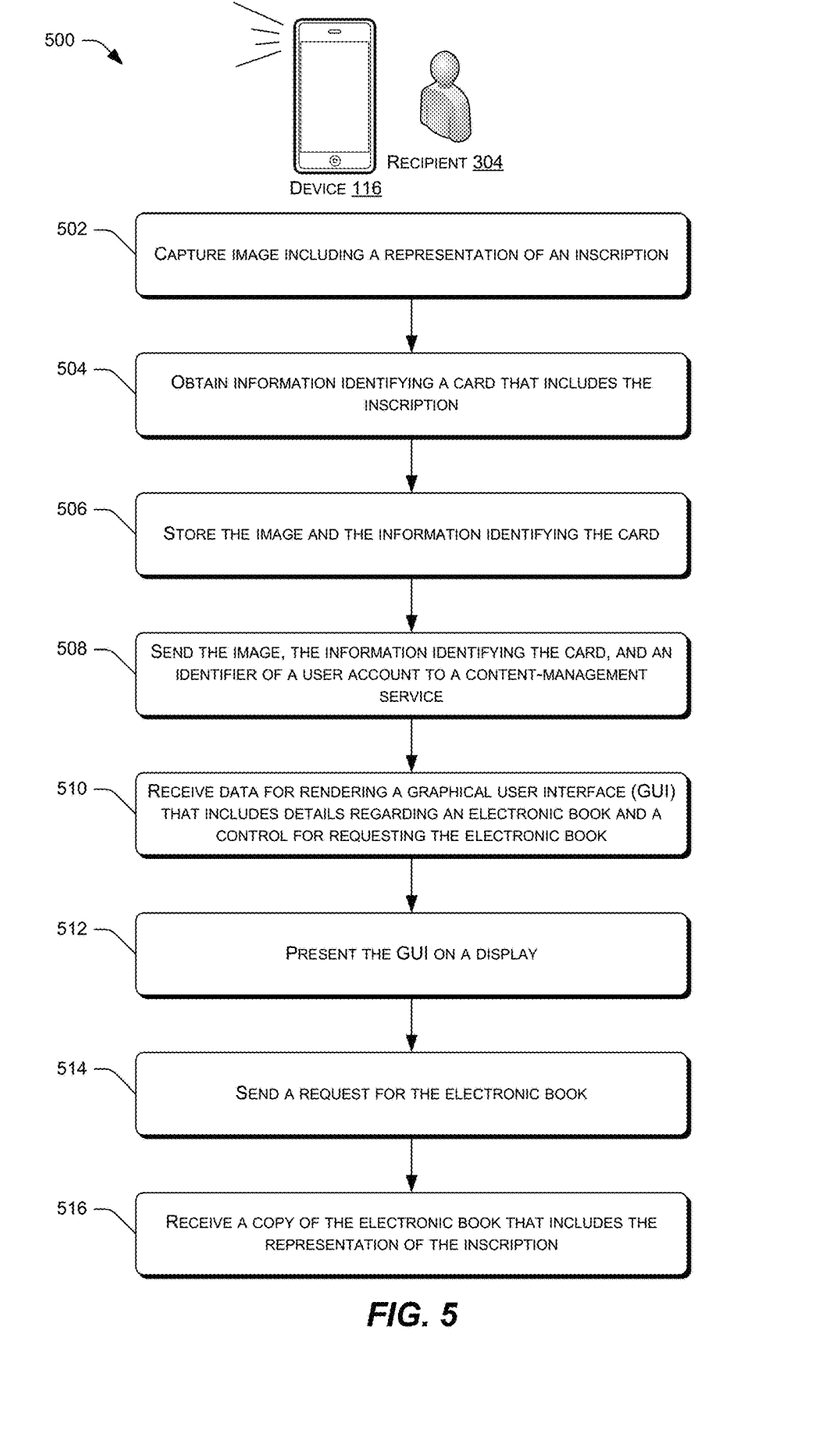
FIG. 5 illustrates a flow diagram of a process in which a user device may send an image of an inscription associated with an electronic book to a content-management service and may thereafter receive a copy of the electronic book that includes the inscription.

FIG. 4 illustrates a flow diagram of a process 400 in which a content-management service may receive an image including a representation of an inscription associated with an electronic book and may provide, to a user device, a copy of the electronic book and the representation of the inscription. The processes discussed herein are each illustrated as a collection of blocks in a logical flow graph, which represent a sequence of operations that can be implemented in hardware, software, or a combination thereof. In the context of software, the blocks represent computer-executable instructions stored on one or more computer-readable media that, when executed by one or more processing units, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In addition, the processes described herein may be performed by a client device, a service that is remote from a client device, or a combination thereof. For instance, the process 400 may, but need not, be performed by the content-management service 104, while a subsequent process 500 may, but need not, be performed by a client device.

At 402, the process 400 includes receiving information identifying an electronic book. For instance, the process 400 may receive information that a client device has received from a physical card that is associated with the electronic book (e.g., after a user has entered in a claim code from the physical card, scanned a barcode from the physical card, or the like). At 404, the process 400 receives an identifier of a user account at a content-management service. For instance, the client device that sent the information identifying the electronic book may also have sent information usable to identify a user account at the content-management service.

At 406, the process 400 receives an image representing an inscription that is to be associated with an electronic book. For instance, the image may have been captured by a client device from a physical card that is associated with the afore-mentioned electronic book. At 408, the process 400 identifies the electronic book and the user account, using the information mentioned above. At 410, the process 400 sends data for rendering a GUI to the client device, with this GUI including details associated with the electronic book and a control selectable to send a request to acquire the electronic book.

At 412, the process 400 receives a request for the electronic book. At 414, the process 400 associates the representation of the inscription and the electronic book with the identified user account and, at 416, sends a copy of the electronic book and the representation of the inscription to the client device. In some instances, sending this information comprises sending a copy of the electronic book with the representation of the inscription embedded therein. In other instances, meanwhile, sending this information includes sending the copy of the electronic book and the representation of the inscription as separate content items. In the latter instances, the sending may further include sending an instruction to present the representation of the inscription at a particular location within the electronic book, such as proximate to a beginning of the electronic book.

FIG. 5 illustrates a flow diagram of another example process 500, which a client device may implement in some instances. At 502, the process 500 captures an image that includes a representation of an inscription. For instance, a client device may capture an image of at least a portion of a physical card that is associated with an electronic book and that includes an inscription, such as a handwritten note, drawing, or the like. At 504, the process 500 obtains information identifying the physical card on which the inscription may reside. For instance, the device may scan a barcode or may otherwise receive (e.g., via manual entry) information identifying the card (such as a redemption code) and, potentially, an electronic book that is associated with the card. At 506, the process 500 stores the image of the inscription and the identifying information.

At 508, the process 500 sends the image, the information identifying the card, and an identifier of a user account at a content-management service to the content-management service. As discussed above, this may comprise single or multiple messages. At 510, the process 500 receives data for rendering a GUI, with the GUI including details of the electronic book and a control for requesting to acquire a copy of the electronic book. At 512, the process 500 presents the GUI on a display of the device and, at 514, sends a request for a copy of the electronic book to the content-management service, potentially in response to receiving activation of the afore-mentioned control on the GUI from a user. At 516, the process 500 receives a copy of the electronic book, with the copy including the representation of the inscription.

Figure 6:
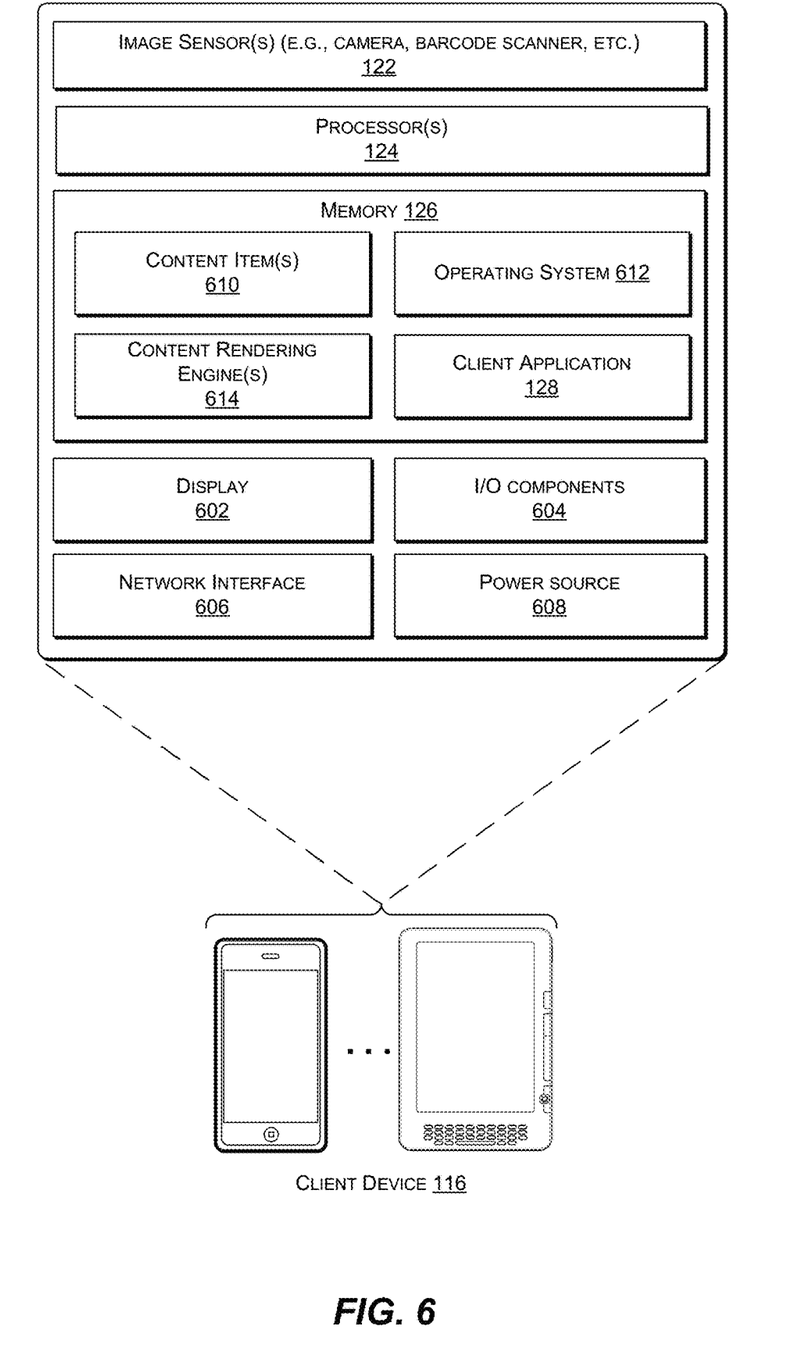
FIG. 6 illustrates an example electronic device that includes features for implementing the techniques described herein.

FIG. 6 illustrates the example client electronic device 116 that includes features for implementing the techniques described herein. The device 116 may be implemented as a mobile telephone, a tablet computing device, an electronic book reader, a laptop computer, a desktop computer, and/or the like. As illustrated, the electronic device 116 may include the one or more image sensors 122, the one or more processors 124, and the memory 126, one or more displays 602 for displaying content items, one or more I/O components 604 for interacting with the device, one or more network interfaces 606, and one or more power sources 608. The network interfaces 606 may support both wired and wireless connection to various networks, such as cellular networks, radio, WiFi networks, short range networks (e.g., Bluetooth®), infrared (IR), and so forth.

Depending on the configuration of the electronic device 116, the memory 126 (and other memory described throughout) is an example of computer storage media and may include volatile and nonvolatile memory. Thus, the memory 126 may include, but is not limited to, RAM, ROM, EEPROM, flash memory, or other memory technology, or any other medium that can be used to store computer-readable instructions, programs, applications, media items, and/or data which can be accessed by the electronic device 116. In some examples, the computer-readable media is a tangible non-transitory computer-readable media.

The memory 126 may be used to store any number of functional components that are executable on the processors 124, as well as content items 610 that are rendered by the electronic device 116. The memory 126 may also store the client application 128 for interacting with the content-management service 104, as discussed above. The memory 126 may also include an operating system 612 and one or more content rendering engines 614 to render content items, such as electronic books, on the device 116. These content presentation engines may be implemented as various applications depending upon the content items. For instance, the content presentation engine may be an electronic book reader application for rendering textual electronic books, an audio player for playing audio books or songs, a video player for playing video, and so forth.

While FIG. 6 illustrates a few example components, the electronic device 116 may have additional features or functionality. For example, the device 116 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the device 116 may reside remotely from the device 116 in some implementations.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
   receiving, by a content-management service and from a device of a user:
      a claim code to identify an electronic book represented by a physical card, wherein the claim code is unique relative to other physical cards associated with the same electronic book;
      an image of at least a portion of the physical card, the image including a handwritten inscription inscribed on the physical card; and
      an identifier associated with a user account of the user at the content-management service;
   identifying, by the content-management service:
      the electronic book associated with the claim code; and
      the user account associated with the identifier;
   storing, by the content-management service, an association between a representation of the handwritten inscription, the electronic book, and the user account;
   receiving, by the content-management service and from the device or another device associated with the user account, a request for the electronic book; and
   sending, by the content-management service, a copy of the electronic book associated with the representation of the handwritten inscription to the device or the another device.

2. The method as recited in claim 1, further comprising sending an instruction to present the representation of the handwritten inscription at a location that is proximate to a beginning of the electronic book.

3. The method as recited in claim 1, further comprising:
   creating a file that includes the copy of the electronic book and the representation of the handwritten inscription embedded within the copy; and
   associating the file with the user account.

4. The method as recited in claim 1, further comprising:
   receiving a request for a physical version of the electronic book; and
   sending, to an address associated with the user account, a copy of the physical version of the electronic book that includes the inscription printed within the physical version of the book.

5. One or more non-transitory computer-readable media storing instructions that,
   when executed, configure a system to perform operations comprising:
      receiving, by a content-management service and from a device of a user:
         a claim code to identify an electronic book represented by a physical card, wherein the claim code is unique relative to other physical cards associated with the same electronic book;

an image of at least a portion of the physical card, the image including a handwritten inscription inscribed on the physical card; and an identifier associated with a user account of the user at the content-management service;

identifying, by the content-management service:
the electronic book associated with the claim code; and
the user account associated with the identifier;

storing, by the content-management service, an association between a representation of the handwritten inscription, the electronic book, and the user account;

receiving, by the content-management service and from the device or another device associated with the user account, a request for the electronic book; and sending, by the content-management service, a copy of the electronic book associated with the representation of the handwritten inscription to the device or the another device.

6. The one or more non-transitory computer-readable media as recited in claim 5,
the operations further comprising sending an instruction to present the representation of the handwritten inscription at a location that is proximate to a beginning of the electronic book.

7. The one or more non-transitory computer-readable media as recited in claim 5,
the operations further comprising:
creating a file that includes the copy of the electronic book and the representation of the handwritten inscription embedded within the copy; and
associating the file with the user account.

8. The one or more non-transitory computer-readable media as recited in claim 5,
the operations further comprising:
receiving a request for a physical version of the electronic book; and
sending, to an address associated with the user account, a copy of the physical version of the electronic book that includes the inscription printed within the physical version of the book.

9. A system comprising:
one or more processors; and
memory storing instructions that, when executed by the one or more processors, configure the system to perform operations comprising:
receiving, by a content-management service and from a device of a user:
a claim code to identify an electronic book represented by a physical card, wherein the claim code is unique relative to other physical cards associated with the same electronic book;
an image of at least a portion of the physical card, the image including a handwritten inscription inscribed on the physical card; and
an identifier associated with a user account of the user at the content-management service;
identifying, by the content-management service:
the electronic book associated with the claim code; and
the user account associated with the identifier;
storing, by the content-management service, an association between a representation of the handwritten inscription, the electronic book, and the user account;
receiving, by the content-management service and from the device or another device associated with the user account, a request for the electronic book; and
sending, by the content-management service, a copy of the electronic book associated with the representation of the handwritten inscription to the device or the another device.

10. The system as recited in claim 9, the operations further comprising sending an instruction to present the representation of the handwritten inscription at a location that is proximate to a beginning of the electronic book.

11. The system as recited in claim 9, the operations further comprising:
creating a file that includes the copy of the electronic book and the representation of the handwritten inscription embedded within the copy; and
associating the file with the user account.

12. The system as recited in claim 9, the operations further comprising:
receiving a request for a physical version of the electronic book; and
sending, to an address associated with the user account, a copy of the physical version of the electronic book that includes the inscription printed within the physical version of the book.

* * * * *